(12) United States Patent
Nikumb et al.

(10) Patent No.: US 7,886,801 B2
(45) Date of Patent: Feb. 15, 2011

(54) APPARATUS AND PROCESS FOR STACKING PIECES OF MATERIAL

(75) Inventors: Suwas Nikumb, London (CA); Craig Dinkel, London (CA)

(73) Assignee: National Research Council of Canada, Ottawa, Ont.

( * ) Notice: Subject to any disclaimer, the term of this patent is extended or adjusted under 35 U.S.C. 154(b) by 1054 days.

(21) Appl. No.: 11/594,106

(22) Filed: Nov. 8, 2006

(65) Prior Publication Data
US 2008/0107514 A1    May 8, 2008

(51) Int. Cl.
*B32B 37/00* (2006.01)
(52) U.S. Cl. ..................... 156/581; 156/580
(58) Field of Classification Search .............. 156/228, 156/580, 581, 583.1
See application file for complete search history.

(56) References Cited

U.S. PATENT DOCUMENTS

| | | | | |
|---|---|---|---|---|
| 4,547,255 A | * | 10/1985 | Yow | 156/580 |
| 4,913,763 A | * | 4/1990 | Yamazaki et al. | 156/358 |
| 6,533,885 B2 | * | 3/2003 | Davis et al. | 156/219 |
| 2002/0109633 A1 | | 8/2002 | Ow et al. | |
| 2003/0020685 A1 | | 1/2003 | Richley et al. | |
| 2003/0195568 A1 | | 10/2003 | O'Phelan et al. | |
| 2004/0049900 A1 | | 3/2004 | Emery et al. | |
| 2005/0132561 A1 | | 6/2005 | Haasl | |
| 2005/0225210 A1 | | 10/2005 | Englund et al. | |
| 2005/0274262 A1 | * | 12/2005 | Recchia, Jr. | 99/353 |
| 2006/0154075 A1 | | 7/2006 | Kuniyasu et al. | |

FOREIGN PATENT DOCUMENTS

| | | |
|---|---|---|
| EP | 973028 | 1/2000 |
| WO | WO 96/04773 | 2/1996 |

OTHER PUBLICATIONS

Harufumi, et al., Espacenet Abstract of JP 03-125504 published May 28, 1991.

* cited by examiner

*Primary Examiner*—James Sells
(74) *Attorney, Agent, or Firm*—Hans Koenig

(57) ABSTRACT

An apparatus for stacking a plurality of pieces of material has an assembly region, one or more platens on a first longitudinal side of the assembly region, and, a plurality of press rams on a second longitudinal side of the assembly region opposite the first longitudinal side. The press rams are movable transversely across the assembly region to immobilize or partially immobilize pieces of material in the assembly region permitting accurate and precise alignment of the pieces relative to each other in the assembly region.

9 Claims, 4 Drawing Sheets

APPARATUS AND PROCESS FOR STACKING PIECES OF MATERIAL

FIELD OF THE INVENTION

The present invention relates to an apparatus and process to facilitate stacking of pieces of material, particularly pieces of material having one or more dimensions in the sub-millimeter range.

BACKGROUND OF THE INVENTION

Stacking pieces of material in an accurate and precise fashion to form stacks having various profiles can be done manually by hand and unassisted when they are large and easy to handle. However, for micro manufacturing applications, when the piece of material is smaller, specialized micromanipulation tools are necessary to assist in stacking. Further, unassisted manual processes are imprecise in terms of placement and off-set adjustment resulting in end products that may not be within specified tolerances. For example, stack tolerance can vary significantly affecting overall dimensions of the device of interest.

In particular, pieces of material having one or more sub-millimeter dimensions, light-weight material and/or very flexible material (e.g. plastic strips) are difficult to handle. Further, as material properties change (e.g. density, volume) there is a greater tendency, particularly for longer pieces of material, to warp or buckle thereby increasing the difficulty of constructing accurately and precisely positioned stacked piles of the material. At sub-millimeter thicknesses (e.g. a few tens of microns), pieces of material are especially difficult to handle for stack fabrication applications.

There remains a need in the art for a method and apparatus to assist in the accurate and precise stacking of pieces of material, particularly pieces of material having sub-millimeter thicknesses.

SUMMARY OF THE INVENTION

In accordance with one aspect of the present invention, there is provided an apparatus for stacking a plurality of pieces of material, the apparatus comprising: an assembly region; one or more platens on a first longitudinal side of the assembly region; and, a plurality of press rams on a second longitudinal side of the assembly region opposite the first longitudinal side, the one or more platens and the plurality of press rams defining the assembly region, the press rams movable transversely across the assembly region to adjust assembly region size.

In accordance with another aspect of the invention, there is provided a process for stacking a plurality of pieces of material comprising: placing first and second pieces of material in an assembly region of an apparatus as described above; aligning the first piece at a predetermined place in the assembly region; aligning the second piece in the assembly region in relation to the first piece; immobilizing the aligned pieces in the assembly region between the press rams and the one or more platens; and securing the first and second pieces together to form a stack.

The assembly region preferably has a length, depth and gap width. Preferably, the gap width along the length of the assembly region is adjustable by transverse movement of the press rams. Transverse movement of the press rams may be effected by any suitable method, for example, with mechanical actuators (e.g. screws, digitized micrometers, motor-mikes) or hydraulic actuators (e.g. hydraulic cylinders), and actuation may be accomplished manually and/or electronically. Preferably, there are three or more press rams, more preferably four or more press rams. Each press ram may have a width that is the same or different from the other press rams.

The one or more platens may be transversely movable or fixed in respect of transverse movement. Preferably, the one or more platens are fixed in respect of transverse movement. Preferably, there is one platen along the length of the assembly region. When pieces of material are placed in the assembly region, the press rams and the one or more platens can be used to immobilize or partially immobilize the pieces in the assembly gap permitting accurate and precise alignment of the pieces relative to each other in the assembly region. The press rams and the one or more platens may be longitudinally movable along the length of the assembly region. The press rams and the one or more platens are preferably fixed in respect of such longitudinal movement. Having a plurality of movable press rams instead of one press ram provides smaller immobilization areas along the length of the pieces thereby providing better control over alignment of the pieces and providing the ability to accommodate stacking of smaller pieces.

The apparatus may further comprise one or more assemblies for assisting the movement of the press rams. For example, the press rams may be mounted on one or more assemblies (e.g. ball slide assemblies and/or air bearing assemblies) to facilitate transverse movement of the rams in response to actuation of the transverse movement of the rams.

The apparatus may further comprise marks to assist in the placement of pieces of material in the assembly region. One or more marks may be used to indicate positions at which pieces may be placed when constructing stacks of the pieces. The marks may be created in any suitable way, for example laser scribing, mechanical scribing, chemical etching, etc. Stacks having a variety of profiles may be constructed. Stacks with staggered profiles having specific off-set distances between ends of the pieces may be constructed, the off-set distances having values dictated by the position of the marks on the apparatus. A common reference point for positioning of the marks may be used, for example, one edge of the apparatus at an end of the assembly region.

The apparatus may further comprise one or more indicators for placement of connectors to secure individual pieces together as the stack is being constructed. Indicators may be, for example, markings, indentations, raised points, etc. Connectors include, for example, adhesives, solder and/or mechanical connectors (e.g. clamps). Preferably, an indicator comprises an indentation that indicates where adhesive or solder may be placed along the pieces to hold pieces together without binding the pieces to the apparatus.

In general, a stack of pieces of material may be constructed from a plurality of pieces as follows. To start with, first and second pieces are placed face to face in the assembly region. All of the press rams are tightened to that the pieces are partially immobilized, e.g. snug but movable, in the assembly region. The first piece, touching the one or more platens, is placed so that an end of the first piece is aligned with the edge of the platen at an end of the assembly region. The second piece, touching the press rams, is placed so that an end of the second piece is aligned either with the end of the first piece or with a mark on the apparatus, the latter facilitating formation of a staggered profile.

The press rams are then tightened so that the pieces cannot move in the assembly region. Preferably, the press rams are tightened one at a time, and preferably in linear order, providing the opportunity to push the edge of the pieces down into the assembly region so that they are touching a bottom of the assembly region before each press ram is tightened along the length of the assembly region. This permits more accurate face to face alignment of the pieces, helping to overcome a tendency for the pieces to warp along their length. Further, once all of the press rams are tightened, one or more press rams can be loosened and re-tightened, if necessary, to permit pushing of the pieces further down into the assembly region and/or to adjust alignment or position of the pieces. One or more connectors are applied to the edge, preferably at predetermined and indicated places, to hold the pieces together. The press rams are then loosened and a third piece is placed in the assembly region, aligned as desired with the first and second pieces in the stack, and the process of tightening the press rams and connecting the pieces repeated. As many pieces as desired may be added to the stack in a similar manner. For variation in stack profile, it is possible to flip the stack around in the assembly region before placement of additional pieces.

One or more spacers may be employed as one or more pieces in the assembly region during stacking to permit stacking of other pieces between a spacer and the press rams and between a spacer and the one or more platens. Individual pieces may be stacked against one face of a spacer and other individual pieces stacked against one or more other faces of the spacer. The stacks may be connected to the spacers, for example with adhesive, solder and/or mechanical connectors (e.g. clamps), to form three-dimensional structures having stacks on one, two, three, four or more faces of the one or more spacers. A spacer may have any suitable cross-sectional shape, for example, triangular, square, rectangular, trapezoidal, circular, or a combination thereof. A spacer may be solid, hollow or partly hollow. A spacer may be of uniform or non-uniform shape and/or size. A spacer may include other features, for example apertures, grooves, etc. in one or more faces.

The apparatus of the present invention is useful for stacking a plurality of pieces of material. Two or more pieces, preferably four or more pieces, may be stacked efficiently and effectively. The apparatus is particularly useful for stacking pieces having sub-millimeter thicknesses. Sub-millimeter thick pieces are difficult to handle and tend to warp along their length making it difficult to form a stable, accurately aligned stack of pieces. The present apparatus permits immobilization of individual pieces during stack construction in a controlled and precise fashion thereby permitting precise alignment of subsequent pieces in relation to preceding pieces as the stack is constructed in the apparatus. Precise and accurate control of piece placement in the assembly region also permits stacking the pieces in a staggered or off-set manner providing excellent control over stack profile. Alignment may be automated using a camera-based closed-loop control system.

Pieces of material may be of any shape or size that permits stacking of the pieces in the apparatus. Preferably, the pieces are flat or thin. Flat pieces have a thickness that is substantially smaller than length or width. Flat pieces may also have a width that is substantially smaller than length. Flat pieces include, for example, plates, strips (e.g. ribbons), etc. Thin pieces have a thickness and a width that are about the same size, the thickness and width being substantially smaller than length. Thin pieces include, for example, wires, strands, etc. Preferably, the plurality of pieces of material comprise flat pieces, more preferably strips.

Individual pieces of material to be stacked in a stack may have the same or different dimensions. For example, individual pieces may have different lengths and a stack may be formed of the individual pieces by aligning and connecting the individual pieces along shorter sections of their full lengths. In another example, individual pieces may have different widths and a stack may be formed having a staggered width profile. Various stack profiles may be created by stacking pieces having differing lengths, widths and/or thicknesses.

There are various applications for stacking sub-millimeter thick pieces. For example, in Microsystems, biological probes for diagnosis and or treatment, electro-physical signal measuring devices, micro signal measuring instrumentation, micro signal detection devices, electronic MEMS-based systems, electronic patch panels, stampings for transformers, etc.

Further features of the invention will be described or will become apparent in the course of the following detailed description.

BRIEF DESCRIPTION OF THE DRAWINGS

In order that the invention may be more clearly understood, embodiments thereof will now be described in detail by way of example, with reference to the accompanying drawings, in which.

DESCRIPTION OF PREFERRED EMBODIMENTS

Figure 1:
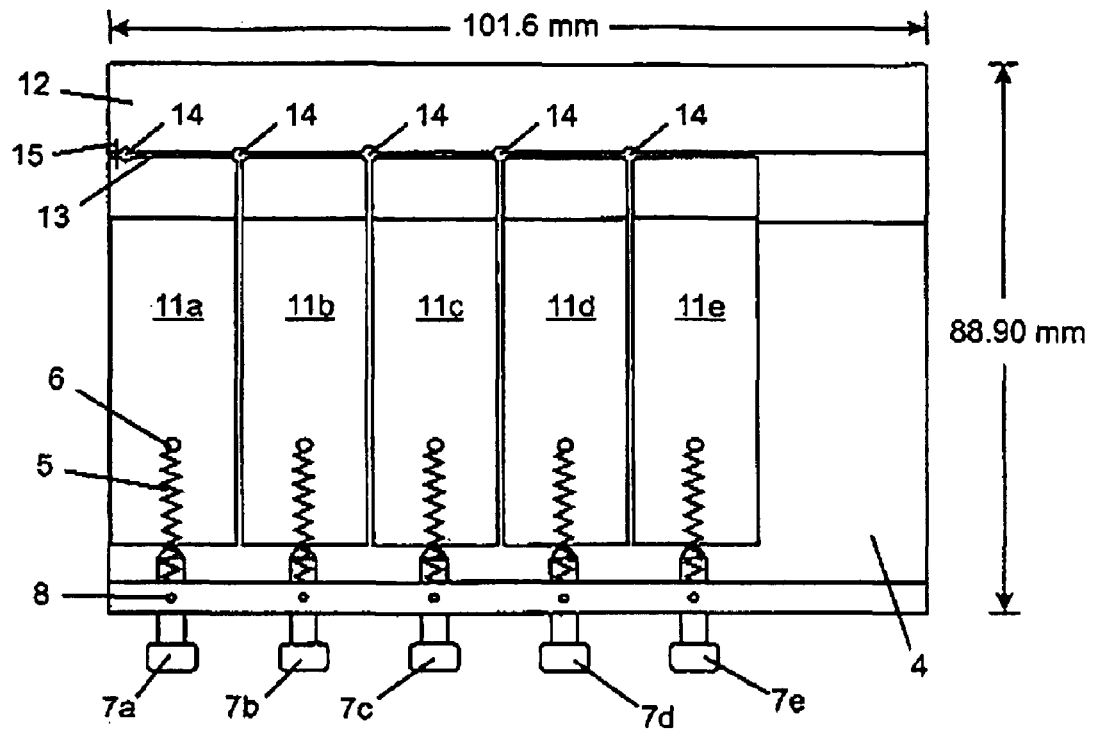
FIG. 1 is a schematic plan view of an apparatus of the present invention.
Figure 2:
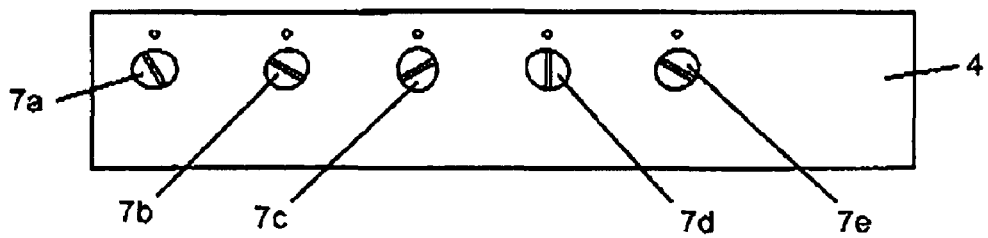
FIG. 2 is a schematic front elevational view of the apparatus of FIG. 1.
Figure 3:
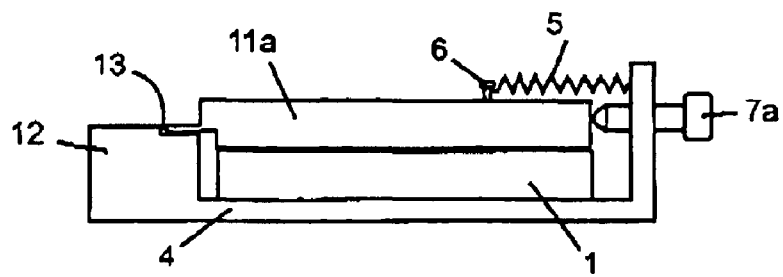
FIG. 3 is a schematic left side elevational view of the apparatus of FIG. 1.

An embodiment of an apparatus of the present invention for assembling a stack of ribbons is depicted in FIGS. 1-3. In FIGS. 1-3, all dimensions are in millimeters (mm) unless otherwise stated. Referring to FIGS. 1-3, the fixture comprises five linear ball slide assemblies 1 (only one labeled) (available from Del-Tron Precision Inc. of Bethel Conn.) on which five movable press rams 11*a-e* are bolted. The ball slide assemblies are bolted to base plate 4. Fixed platen 12 is an integral part of the base plate. Five torsion wire springs 5 (only one labeled) connect each of the movable rams to the base plate. The springs are bolted to the movable rams with socket head cap screws 6 (only one labeled) and to the base plate with set screws 8 (only one labeled). Five fine pitch adjustment screws 7*a-e* are mounted in the base plate through threaded apertures so that the tip of each fine pitch screw contacts the movable rams. The base plate, including the fixed platen, and the movable rams are made of aluminum.

The five ball slide assemblies permit movement of the five movable rams in response to actuation of the five fine pitch adjustment screws. Each of the five movable rams can be controlled separately. Movement of the five movable rams results in opening and closing of assembly gap 13 in five stretches along the gap. Assembly gap 13 is formed by a notched region in platen 12, the notched region being a section of the platen having orthogonal surfaces, one surface forming the closed bottom of the assembly gap and the other forming the first longitudinal side of the assembly gap. The second longitudinal side of the assembly gap is formed by the movable rams opposite the first longitudinal side. The assembly gap is used for holding the ribbons in place during the stacking procedure. Having a plurality of movable rams instead of one provides smaller clamping areas along the length of the stack of ribbons thereby providing better control over alignment of the ribbons. Five indentations 14 identify position and application of adhesive to the stack without adhering to the rams or platen. Each indentation is split so that one part of the indentation is on the fixed platen and another part is on the movable rams. Laser marked line 15 is inscribed in fixed platen 12 and movable ram 11a. This mark is used as a guide for off-set distance. More than one mark may be used if the off-set distance between adjacent ribbons is to differ as the stack is constructed.

The apparatus provides improved alignment of individual ribbons, more precise stacking and better maintenance of overall size within specifications.

Figure 4A:
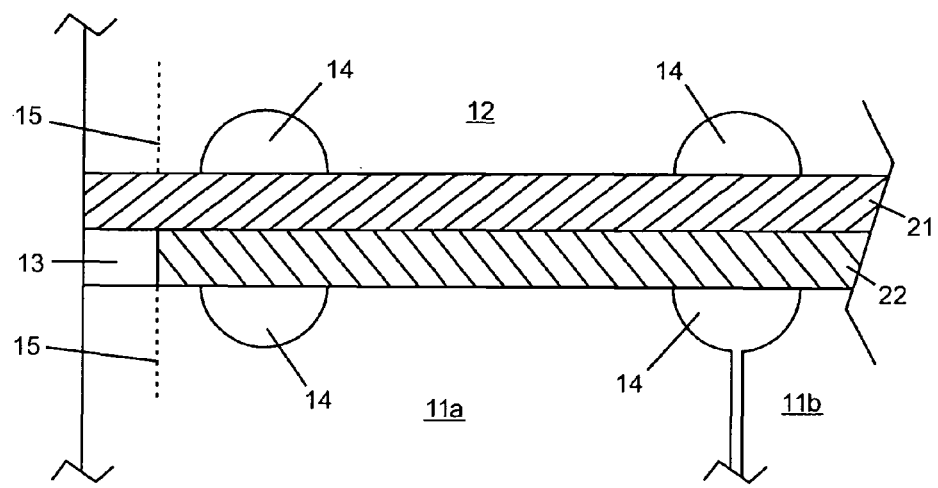
FIG. 4A is a schematic plan view of a magnified area of the apparatus of FIG. 1 showing two ribbons of material aligned in an assembly gap of the apparatus.
Figure 4B:
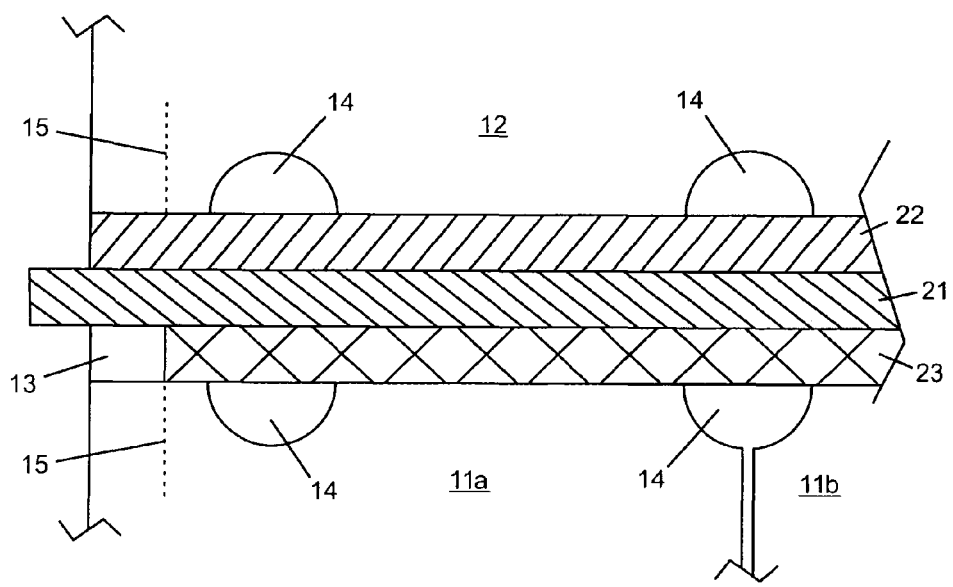
FIG. 4B is a schematic plan view of the magnified area of FIG. 4A showing three ribbons of material aligned in the assembly gap.

With reference to FIGS. 4A and 4B as well as FIGS. 1-3, to stack ribbons into an assembled stack using the apparatus, the following is an example of a procedure that may be followed. Constructing stacks of different profiles would involve different flipping and alignment protocols, which are well within the ability of one skilled in the art to work out for a desired profile.

1. To start with, first ribbon 21 and second ribbon 22 are placed face-to-face in assembly gap 13.

2. Movable rams 11a-e are tightened using fine pitch adjustment screws 7a-e so that the ribbons are snug together but movable.

3. First ribbon 21 touching fixed platen 12 is aligned with the left edge of the fixed platen as shown in FIG. 4A.

4. Second ribbon 22 touching the movable rams is aligned with laser marked line 15, which is the off-set distance (e.g. 0.5 mm) away from the left edge.

5. Movable ram 11a is tightened.

6. The edges of ribbons 21,22 are pushed down so that they are touching the bottom of assembly gap 13 near movable ram 11b then movable ram 11b is tightened.

7. Step 6 is repeated for the remaining movable rams of the apparatus.

8. Movable jaw 11a is tightened, the ribbons 21,22 are pushed down and movable jaw 11a is tightened.

9. Adhesive is applied to the edge of the ribbons in indentations 14 and the adhesive is allowed to dry.

10. The movable jaws are loosened, the stacked ribbons are taken out and the stack is flipped 180° around its edge.

11. The stacked ribbons are inserted back into assembly gap 13 and second ribbon 22 touching fixed platen 12 is aligned with the left edge of the fixed platen, as shown in FIG. 4B.

12. Third ribbon 23 is inserted into assembly gap 13 so that it is touching the movable rams and aligned with laser marked line 15 as shown in FIG. 4B.

13. Steps 5 to 12 are repeated for all remaining ribbons.

With reference to FIGS. 5A-5D and FIGS. 1-3, to stack ribbons into an assembled stack on two sides of a hollow rectangular spacer, the following is an example of a procedure that may be followed. Constructing stacks of different profiles would involve different flipping and alignment protocols, which are well within the ability of one skilled in the art to work out for a desired profile.

1. To start with, spacer 30 and first ribbon 31 are placed face-to-face in assembly gap 13.

2. Movable rams 11a-e are tightened using fine pitch adjustment screws 7a-e so that the spacer and ribbon are snug together but movable.

Figure 5A:
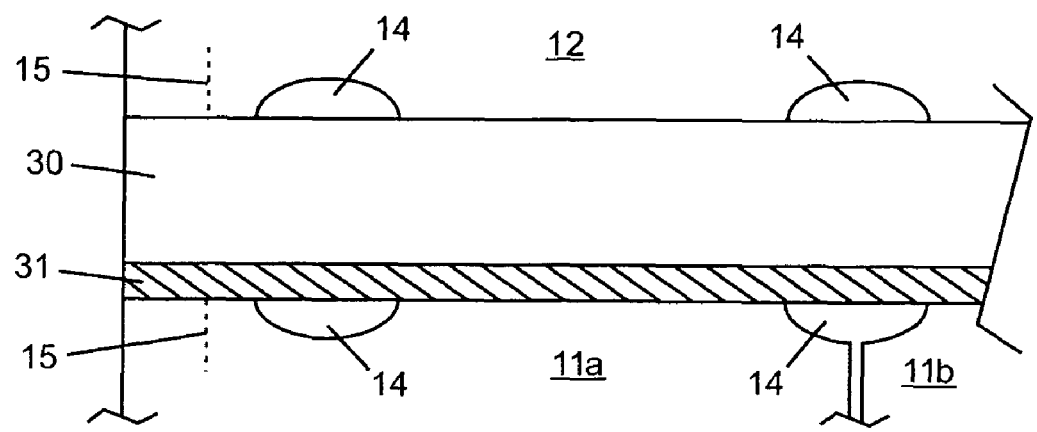
FIG. 5A is a schematic plan view of a magnified area of the apparatus of FIG. 1 showing one ribbon of material and a hollow spacer aligned in an assembly gap of the apparatus.

3. Spacer 30 touching fixed platen 12 is aligned with the left edge of the fixed platen as shown in FIG. 5A.

4. First ribbon 31 touching the movable rams is also aligned with the left edge of the fixed platen as shown in FIG. 5A.

5. Movable ram 11a is tightened.

6. The edges of spacer 30 and first ribbon 31 are pushed down so that they are touching the bottom of assembly gap 13 near movable ram 11b then movable ram 11b is tightened.

7. Step 6 is repeated for the remaining movable rams of the apparatus.

8. Movable jaw 11a is tightened, the spacer 30 and first ribbon 31 are pushed down and movable jaw 11a is tightened.

9. Adhesive is applied to the edge of the spacer and the first ribbon in indentations 14 and the adhesive is allowed to dry.

10. The movable jaws are loosened, the stacked spacer and ribbon are taken out and the stack is flipped 180° around its edge.

Figure 5B:
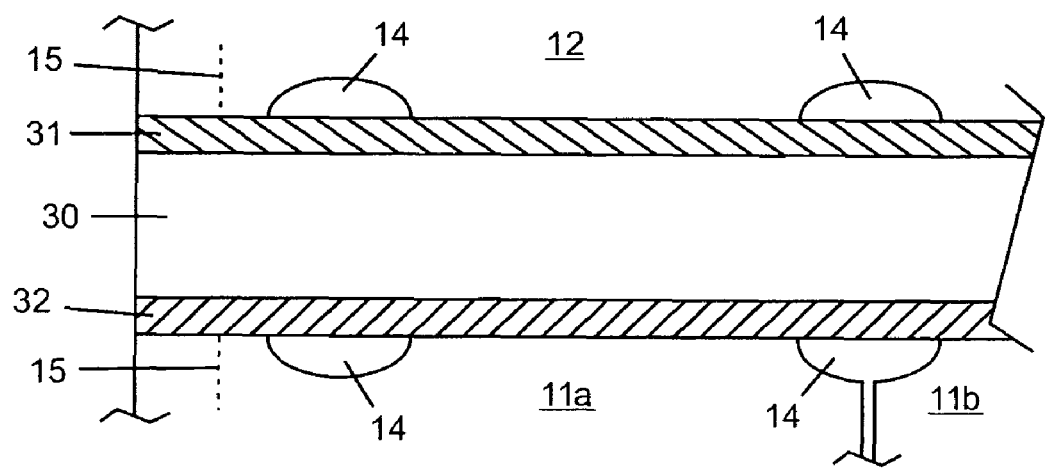
FIG. 5B is a schematic plan view of the magnified area of FIG. 5A showing two ribbons of material and a hollow spacer aligned in the assembly gap.

11. The stacked spacer and first ribbon are inserted back into assembly gap 13 and first ribbon 31 touching fixed platen 12 is aligned with the left edge of the fixed platen, as shown in FIG. 5B.

12. Second ribbon 32 is inserted into assembly gap 13 so that it is touching the movable rams and aligned with the left edge of the fixed platen, as shown in FIG. 5B.

13. Steps 5 to 9 are repeated to attach the second ribbon.

Figure 5C:
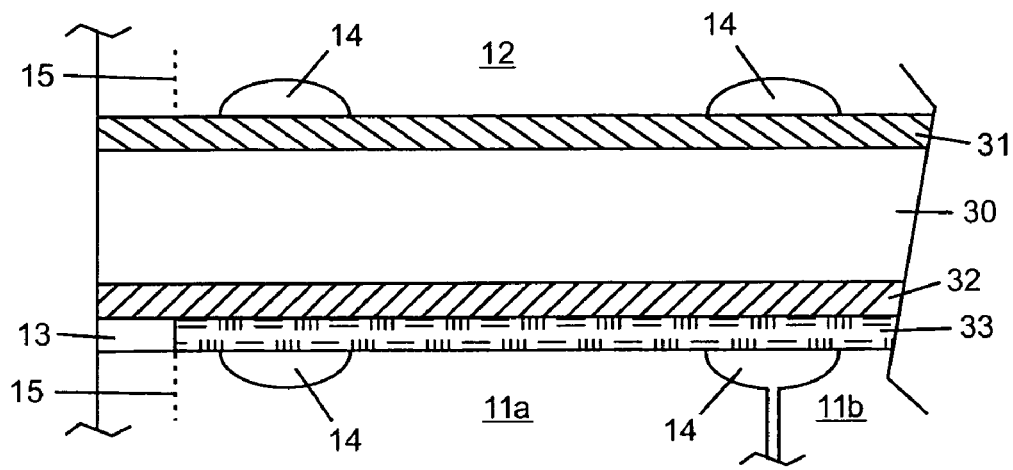
FIG. 5C is a schematic plan view of the magnified area of FIG. 5B showing three ribbons of material and a hollow spacer aligned in the assembly gap; and, FIG. 5D is a schematic plan view of the magnified area of FIG. 5C showing four ribbons of material and a hollow spacer aligned in the assembly gap.

14. The movable jaws are loosened and first ribbon 31 touching fixed platen 12 is aligned with the left edge of the fixed platen, as shown in FIG. 5C.

15. Third ribbon 33 is inserted into assembly gap 13 so that it is touching the movable rams and aligned with laser marked line 15, which is the off-set distance (e.g. 0.5 mm) away from the left edge, as shown in FIG. 5C.

16. Steps 5 to 10 are repeated to attach the third ribbon in place.

Figure 5D:
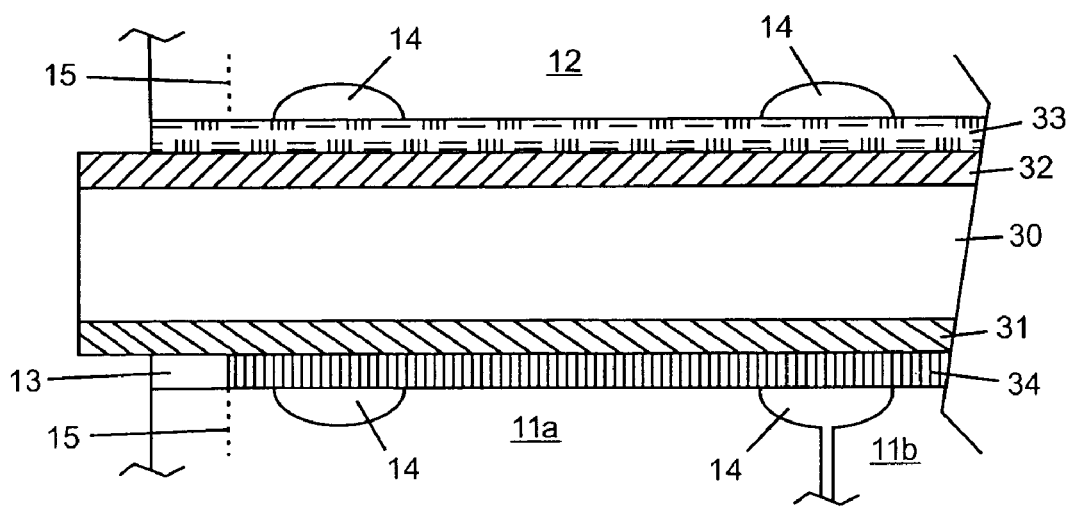

17. The stacked spacer and ribbons are inserted back into assembly gap 13 and third ribbon 33 touching fixed platen 12 is aligned with the left edge of the fixed platen, as shown in FIG. 5D.

18. Fourth ribbon 34 is inserted into assembly gap 13 so that it is touching the movable rams and aligned with laser marked line 15, which is the off-set distance (e.g. 0.5 mm) away from the left edge, as shown in FIG. 5D.

19. Steps 5 to 10 are repeated to attach the fourth ribbon in place.

20. Steps 17-19 are repeated for all remaining ribbons.

Other advantages that are inherent to the structure are obvious to one skilled in the art. The embodiments are described herein illustratively and are not meant to limit the scope of the invention as claimed. Variations of the foregoing embodiments will be evident to a person of ordinary skill and are intended by the inventor to be encompassed by the following claims.

The invention claimed is:

1. Apparatus for stacking a plurality of pieces of material, the apparatus comprising: an assembly region having a closed bottom on which the pieces of material rest; one or more platens having a notched region forming both the closed bottom and a first longitudinal side of the assembly region, the one or more platens integrally formed with a base plate; and, a plurality of press rams on a second longitudinal side of the assembly region opposite the first longitudinal side, the one or more platens and the plurality of press rams defining the assembly region, the press rams supported on the base plate and movable transversely across the assembly region to adjust assembly region size.

2. Apparatus of claim 1, wherein the plurality of press rams is three or more press rams.

3. Apparatus of claim 1, wherein the plurality of press rams is four or more press rams.

4. Apparatus of claim 1, wherein the one or more platens is one fixed platen.

5. Apparatus of claim 1, wherein the one or more press rams are mounted on one or more ball slide assemblies.

6. Apparatus of claim 1, further comprising marks to assist in placement of the pieces in the assembly region.

7. Apparatus of claim 1, further comprising one or more indicators for placement of connectors.

8. Apparatus of claim 7, wherein the indicators comprise indentations and the connectors comprise adhesive.

9. Apparatus of claim 1, further comprising one or more fine adjustment screws for effecting transverse movement of the press rams.

* * * * *